(12) United States Patent
Tomabechi

(10) Patent No.: US 12,368,469 B2
(45) Date of Patent: Jul. 22, 2025

(54) COMMUNICATION SYSTEM

(71) Applicant: CANON KABUSHIKI KAISHA, Tokyo (JP)

(72) Inventor: Masaru Tomabechi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 401 days.

(21) Appl. No.: 18/151,773

(22) Filed: Jan. 9, 2023

(65) Prior Publication Data

US 2023/0223991 A1 Jul. 13, 2023

(30) Foreign Application Priority Data

Jan. 13, 2022 (JP) ................................ 2022-003905

(51) Int. Cl.
*H04B 5/24* (2024.01)
*H04B 5/72* (2024.01)

(52) U.S. Cl.
CPC ................. *H04B 5/24* (2024.01); *H04B 5/72* (2024.01)

(58) Field of Classification Search
CPC ... H04B 5/24; H04B 5/72; H04B 5/22; Y02D 30/70
USPC ....................................................... 455/41.1
See application file for complete search history.

(56) References Cited

U.S. PATENT DOCUMENTS

| 10,915,717 | B1* | 2/2021 | Blair | G06K 7/10009 |
| 2004/0263281 | A1* | 12/2004 | Podell | H01P 5/185 333/116 |
| 2022/0277602 | A1* | 9/2022 | McFarthing | H04B 5/24 |
| 2022/0323038 | A1* | 10/2022 | Morita | A61B 6/56 |

FOREIGN PATENT DOCUMENTS

JP H08224233 A 9/1996

* cited by examiner

*Primary Examiner* — Eugene Yun
(74) *Attorney, Agent, or Firm* — Canon U.S.A., Inc. IP Division

(57) ABSTRACT

A communication system configured to perform wireless communication using electromagnetic field coupling, the communication system includes a transmission circuit, at least two long couplers, a reception circuit, a short coupler, and a signal control unit, wherein the transmission circuit outputs a signal to one end of each of the at least two long couplers, wherein the reception circuit receives the signal output from the short coupler, wherein the signal is input from at least one of the at least two long couplers to the short coupler by electromagnetic field coupling, and wherein the signal control unit controls the signal output from the transmission circuit.

8 Claims, 5 Drawing Sheets

COMMUNICATION SYSTEM

BACKGROUND OF THE DISCLOSURE

Field of the Disclosure

The present disclosure relates to a communication system.

Description of the Related Art

Wireless communication using electromagnetic field coupling between apparatuses in proximity to each other has been utilized in communication systems. Using wireless data transmission at a rotatable portion of, for example, a robot arm or a network camera reduces cable abrasions and realizes free rotation. Japanese Patent Application Laid-open No. H8-224233 discusses a technique for data communication using electromagnetic field coupling between a rotatable coupler and a fixed coupler.

In Japanese Patent Application Laid-open No. H8-224233, a coupler shielding member is provided to shield the couplers from electromagnetic irradiation. However, this configuration has an issue that the size of a communication system is large.

SUMMARY OF THE DISCLOSURE

The present disclosure is directed to a technique for reducing an influence of interference noises while an increase of a system size in the wireless communication system is suppressed.

According to an aspect of the present disclosure, a communication system configured to perform wireless communication using electromagnetic field coupling, the communication system includes a transmission circuit, at least two long couplers, a reception circuit, a short coupler, and a signal control unit, wherein the transmission circuit outputs a signal to one end of each of the at least two long couplers, wherein the reception circuit receives the signal output from the short coupler, wherein the signal is input from at least one of the at least two long couplers to the short coupler by electromagnetic field coupling, and wherein the signal control unit controls the signal output from the transmission circuit in such a manner that the signal to be input to the long coupler which is weakly coupled with the short coupler in comparison with the other long coupler is attenuated or stopped or the signal to be input to the long coupler which is strongly coupled with the short coupler in comparison with the other long coupler is amplified.

Further features of the present disclosure will become apparent from the following description of exemplary embodiments with reference to the attached drawings.

DESCRIPTION OF THE EMBODIMENTS

Hereinbelow, exemplary embodiments of the present disclosure will be described with reference to the attached drawings. Note that the following exemplary embodiments are not necessarily intended to limit the present disclosure, and all the combinations of features described in the following exemplary embodiments are not necessarily essential.

Figure 1:
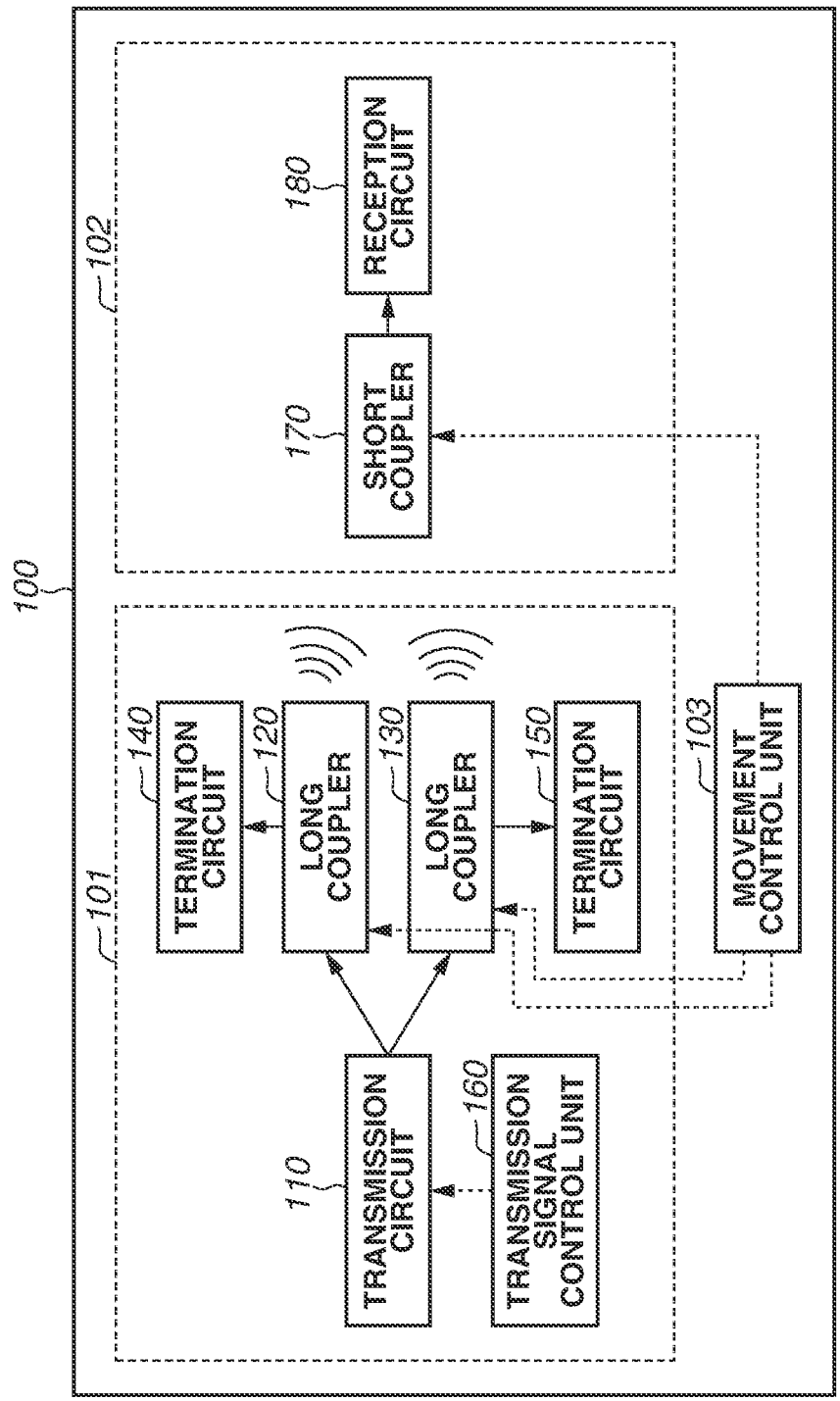
FIG. 1 is a block diagram illustrating an example configuration of a communication system according to a first exemplary embodiment.

FIG. 1 is a block diagram illustrating an example configuration of a communication system 100 according to a first exemplary embodiment. The communication system 100 performs wireless communication using electromagnetic field coupling between long couplers and a short coupler.

The electromagnetic field coupling according to the present exemplary embodiment includes electric field coupling and magnetic field coupling. More specifically, the wireless communication between transmission lines can be performed using the electric field coupling, the magnetic field coupling, or both of the electric field coupling and the magnetic field coupling.

The communication system 100 includes a communication apparatus 101 as a sender, a communication apparatus 102 as a receiver, and a movement control unit 103. The communication apparatus 101 as a sender includes a transmission circuit 110, long couplers 120 and 130, termination circuits 140 and 150, and a transmission signal control unit 160. The communication apparatus 102 as a receiver includes a short coupler 170 and a reception circuit 180. The communication apparatus 101 as a sender and the communication apparatus 102 as a receiver can be a first component and a second component included in a single apparatus, or can be separate apparatuses.

The communication system 100 includes a structure that supports the communication apparatus 101 as a sender and the communication apparatus 102 as a receiver to maintain a predetermined positional relationship between the communication apparatus 101 and the communication apparatus 102 (i.e., positional relationship in which the long couplers 120 and 130 face the short coupler 170). For example, in a case where the communication system 100 is a gantry loader, the communication apparatus 101 as a sender is a traveling portion, and the communication apparatus 102 as a receiver is a fixed portion. However, the communication system 100 is not limited to the gantry loader and can be a network camera, a robot arm, or the like.

The long couplers 120 and 130 are coupled with the short coupler 170 by electromagnetic field and each function as an antenna for wireless communication between the communication apparatus 101 as a sender and the communication apparatus 102 as a receiver. The transmission circuit 110 generates electrical signals and inputs the electrical signals into one-end sides (hereinbelow, referred to as input ends) of the long couplers 120 and 130. The transmission circuit 110 can be configured of a combination including a signal source, a differential buffer, an amplifier, a distributor, an attenuator, and a switch, and can control an amplification amount, an attenuation amount, and ON/OFF of signals to be input to the long couplers 120 and 130. However, the control method of signals is not limited thereto and can be implemented by a software configuration or another hardware configuration.

The termination circuits 140 and 150 are connected to the other ends (hereinbelow, referred to as output ends) of the long couplers 120 and 130, respectively. When the signals are input from the transmission circuit 110 to the input ends of the long couplers 120 and 130, the signals are transmitted to the output ends of the long couplers 120 and 130. In other words, the long couplers 120 and 130 each function as a transmission line. In response to the inputting of the electrical signals to the long couplers 120 and 130, a voltage is induced in the short coupler 170 by the electromagnetic field, and the reception circuit 180 restores the electrical signals based on the generated voltages. As the restoration method of the electrical signal, a comparator can be used. Alternatively, other circuits can be used. As described above, the transmission circuit 110 and the reception circuit 180 perform wireless communication using the electromagnetic field coupling between the long couplers 120 and 130 and the short coupler 170.

The movement control unit 103 changes the positional relationship between the long couplers 120 and 130 and the short coupler 170 by moving at least any one of the communication apparatus 101 as a sender and the communication apparatus 102 as a receiver in a predetermined direction. For example, the movement control unit 103 includes a rail for supporting the communication apparatus 101, a motor for moving the communication apparatus 101 along the rail, and a power source for supplying power to the motor. The movement control unit 103 can directly move the long couplers 120 and 130, the short coupler 170, or both of them, instead of moving the entire body of the communication apparatus 101 or the entire body of the communication apparatus 102. The configuration of the communication apparatus 101 as a sender and the communication apparatus 102 as a receiver is not limited to the configuration for one-way communication illustrated in FIG. 1. Alternatively, the communication apparatus 102 can include a long coupler, and the communication apparatus 101 can include a short coupler, so that bidirectional communication can be performed.

A description will be given of a configuration of signal transmission from the communication apparatus 101 to the communication apparatus 102. Signal transmission from the communication apparatus 102 to the communication apparatus 101 is also performed in the similar manner. However, the configuration in which the communication apparatus 101 transmits the signal to the communication apparatus 102 and the configuration in which the communication apparatus 102 transmits the signal to the communication apparatus 101 can be different from each other.

While, in FIG. 1, the communication apparatus 101 as a sender includes two long couplers, the number of the long couplers can be more than two.

Next, with reference to FIG. 2, configurations of the long couplers 120 and 130, and the short coupler 170, and the signal control method based on the positional relationship between long couplers 120 and 130 and the short coupler 170 will be described. The transmission circuit 110 includes signal sources 111 and 112 and the differential buffers 113 and 114, and the transmission circuit 110 inputs signals to the ends of the long couplers 120 and 130. While, in the present exemplary embodiment, the transmission circuit 110 includes the two signal sources 111 and 112, the transmission circuit 110 can have a different configuration. For example, the transmission circuit 110 can have a single signal source. The transmission signal can be divided using a distributor, and an amplifier, a variable attenuator, and a switch can be connected to the subsequent stage of the distributor.

The long coupler 120 is a conductor member disposed on one surface of a substrate 121, and a ground 122 is disposed on the opposite surface of the substrate 121. The long coupler 130 is a conductor member disposed on one surface of a substrate 131, and a ground 132 is disposed on the opposite surface of the substrate 131. The transmission circuit 110 is connected to the input ends of the long couplers 120 and 130, and termination circuits 141 and 151 are connected to the output ends of the long couplers 120 and 130, respectively. When signals are input from the transmission circuit 110 to the input ends of the long couplers 120 and 130, the signals are transmitted in directions toward the output ends of the long couplers 120 and 130 (direction from 180 degrees (°) to 0° and direction from 180° to 360°). In other words, the long couplers 120 and 130 each function as a signal line of the transmission line. While, in the present exemplary embodiment, each of the transmission lines is a differential microstrip transmission line, the form of the transmission lines is not limited thereto. For example, each of the transmission lines can be a stripline transmission line or a single-ended transmission line. The output ends of the long couplers 120 and 130 are terminated by the termination circuits 141 and 151, respectively. While, in the present exemplary embodiment, resistors having impedances approximately equal to the characteristic impedances of the long couplers 120 and 130 are connected as the termination circuits 141 and 151 between the output ends of the long couplers 120 and 130 and the respective grounds, a termination method having a topology of, for example, Thevenin termination, T shaped termination, or H type termination can be used.

The short coupler 170 is a conductive member disposed on one surface of a substrate 171, and a ground 172 of a metal member is disposed on the opposite surface of the substrate 171. When signals are input to the long couplers 120 and 130, electric charge is induced in the short coupler 170 by the electromagnetic field, and a signal is output via the reception circuit 180 connected to the short coupler 170. In this way, the short coupler 170 functions as an electrode of a capacitor. The configuration of the short coupler 170 is not limited to the above-described configuration. For example, the reception circuit 180 can be connected to one end of the short coupler 170, a termination circuit can be connected to the other end of the short coupler 170, and the short coupler 170 can function as a signal line of a transmission line.

Figure 2:
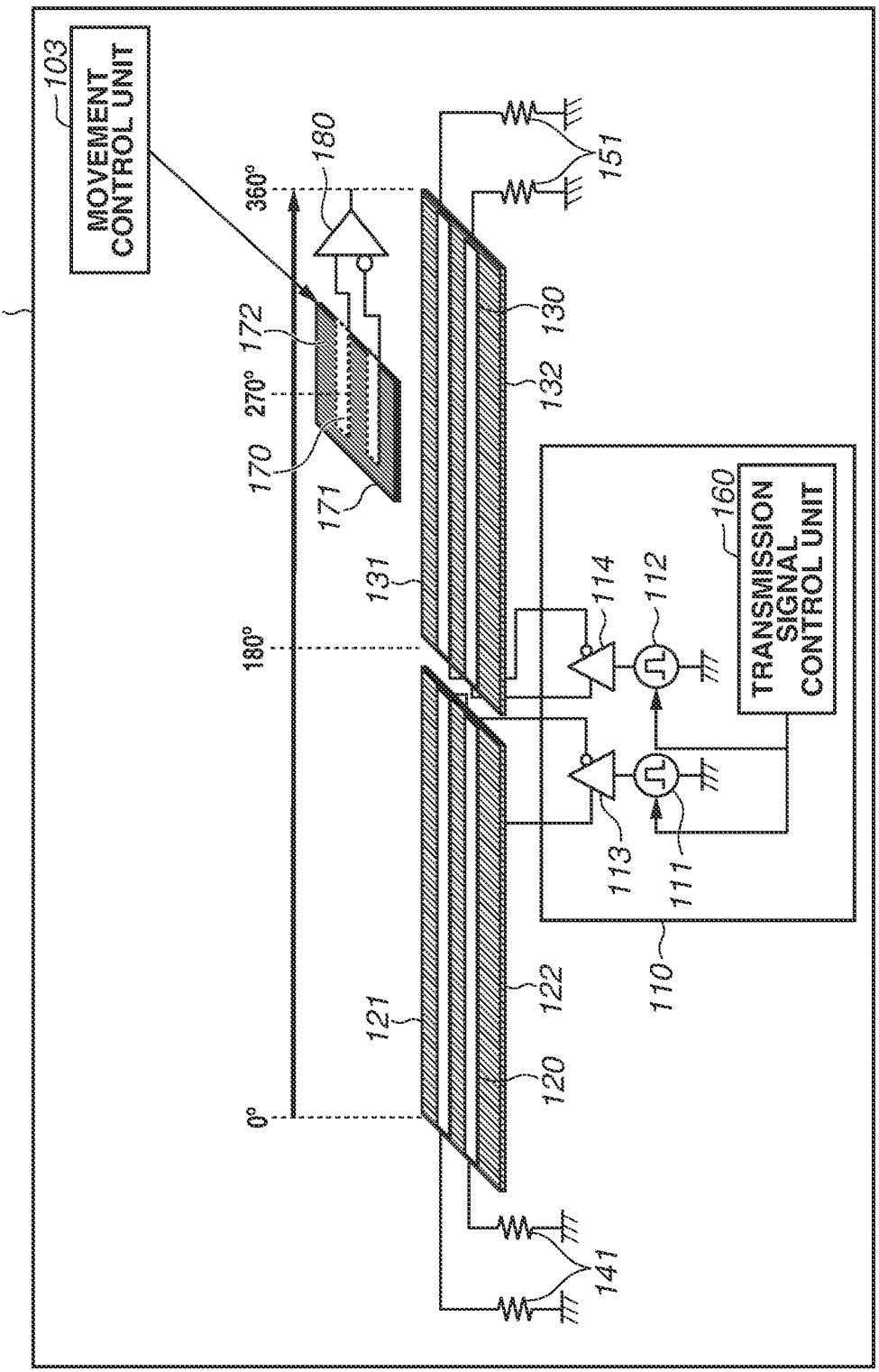
FIG. 2 is a diagram illustrating an example configuration of the communication system according to the first exemplary embodiment.

The length of the short coupler 170 is shorter than the length of each of the long couplers 120 and 130 in a lengthwise direction of the long couplers 120 and 130 (from 0° to 360° direction in FIG. 2). Further, when viewed in a direction orthogonal to signal transmission directions of the long couplers 120 and 130, the long couplers 120 and 130 and the short coupler 170 have a positional relationship overlapping each other at least in a part. The movement control unit 103 changes the relative position of the short coupler 170 with respect to the long couplers 120 and 130 in the signal transmission directions of the long couplers 120 and 130. For example, the movement control unit 103 moves the short coupler 170 within a range where the short coupler 170 faces the long couplers 120 and 130 (i.e., from 0° to 360° direction in FIG. 2). However, the movement range is not limited to the above-described range, and the short coupler 170 can move in part of the range over the long couplers 120 and 130 or to the outside of the range over the long couplers 120 and 130. While, in the present exemplary embodiment, the long couplers 120 and 130 are formed on the substrates 121 and 131, the long couplers 120 and 130 can be formed on a single substrate.

In a case where the short coupler 170 is at a position of 270° with respect to the long couplers 120 and 130, the short coupler 170 strongly couples with the long coupler 130 and receives signals from the long coupler 130. Signals from the long coupler 120 weakly coupled with the short coupler 170 is received by the short coupler 170 as interference noises. The interference noises include an electromagnetic field noise caused by interference from space and a conduction noise caused by interference from a circuit or a ground. In this case, the transmission signal control unit 160 can improve the signal-to-noise (S/N) ratio in the wireless communication between the long coupler 130 and the short coupler 170, by attenuating or stopping signals to be input to the long coupler 120. Example methods of attenuating or stopping signals include turning ON/OFF of a switch provided in the transmission circuit 110 and controlling the attenuation amount of the variable attenuator. Further, the method can be also achieved by software or other hardware. The transmission signal control unit 160 can perform the control by detecting the positional relationship between the long couplers 120 and 130 and the short coupler 170 or based on information, such as a positional relationship set in advance in the communication system and a movement sequence.

Similarly, the S/N ratio can be improved in the wireless communication between the long coupler 130 and the short coupler 170, by amplifying signals to be input to the long coupler 130 strongly coupled with the short coupler 170. Example methods of amplifying signals include controlling the amplifier, but can be also achieved by software or other hardware. Further, the attenuation amount or the amplification amount of signals to be input to the long coupler 120 or 130 can be changed based on intensity of the coupling with the short coupler 170 or the position of the short coupler 170, and amplification and attenuation of signals can be performed at a same time.

Figure 3:
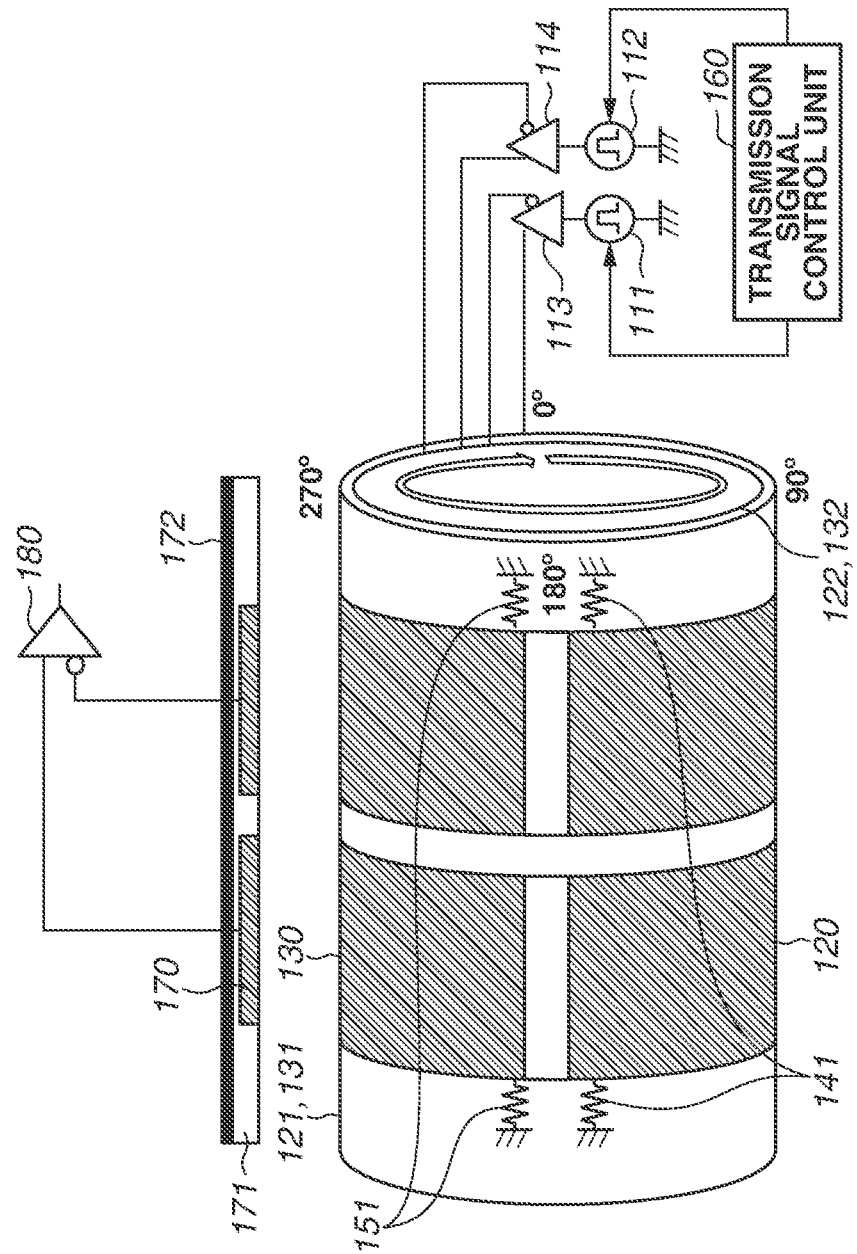
FIG. 3 is a diagram illustrating an example configuration of the communication system according to the first exemplary embodiment.

Also even in a system in which both of the substrates 121 and 131 have a ring shape and signals output from the two signal sources 111 and 112 are input to the long couplers 120 and 130 as illustrated in FIG. 3, the S/N ratio of the wireless communication can be improved by control similar to the above-described control. In this case, the substrates 121 and 131 are each formed with, for example, a flexible circuit board. In this configuration, since the short coupler 170 can be relatively moved in a circumferential direction with respect to the long couplers 120 and 130, wireless communication can be performed between the long couplers 120 and 130 and the short coupler 170 while the short coupler 170 is rotationally moved.

As described above, the communication system 100 according to the present exemplary embodiment controls the signals to be input to the long couplers 120 and 130 to reduce interference noises from the long coupler weakly coupled with the short coupler 170 or amplify signals to be input to the long coupler strongly coupled with the short coupler 170, based on intensity of the couplings between the short coupler 170 and the long couplers 120 and 130. In this way, the S/N ratio of wireless communication can be improved. Further, it is possible to suppress increase of a system size because the structure of shielding the wireless communication unit to reduce interference noises from outside or other communications is not required.

Figure 4:
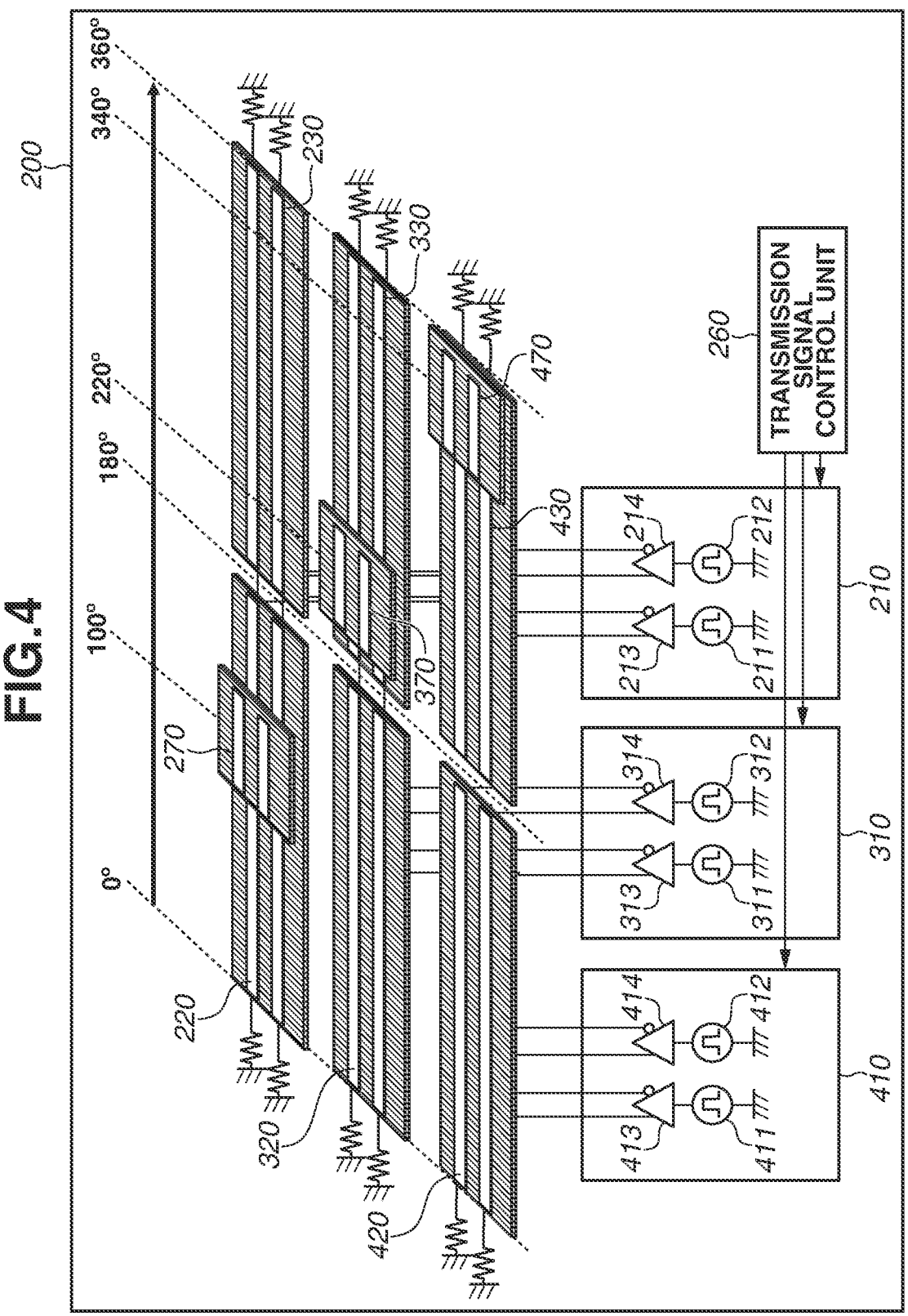
FIG. 4 is a diagram illustrating an example configuration of a communication system according to a second exemplary embodiment.

Next, a communication system 200 according to a second exemplary embodiment will be described. Hereinbelow, the description is mainly given of different points between the second exemplary embodiment and the first exemplary embodiment, and the redundant descriptions are omitted. FIG. 4 is a diagram illustrating an example configuration of the communication system 200 according to the second exemplary embodiment. The communication system 200 is different from the communication system 100 in that the communication system 200 includes a plurality of pairs of long couplers and a short coupler performing wireless communication, the wireless communication is performed in each of the pairs, and the short couplers are disposed at positions different from each other in signal transmission directions of the long couplers.

In the communication system 200, a transmission circuit 210 includes signal sources 211 and 212 and differential buffers 213 and 214 and inputs signals to input ends of long couplers 220 and 230. A transmission circuit 310 includes signal sources 311 and 312 and differential buffers 313 and 314 and inputs signals to input ends of long couplers 320 and 330. A transmission circuit 410 includes signal sources 411 and 412 and differential buffers 413 and 414 and inputs signals to input ends of long couplers 420 and 430. Output ends of the long couplers 220, 230, 320, 330, 420, and 430 is each terminated with a termination circuit. The long couplers 220, 320, and 420 are disposed at positions adjacent to the long couplers 230, 330, and 430, respectively. The long couplers 220 and 230 and a short coupler 270, when viewed in a direction orthogonal to signal transmission directions of the long couplers 220 and 230, have a positional relationship overlapping each other at least in a part. A positional relationship between a short coupler 370 and the long couplers 320 and 330 and a positional relationship between a short coupler 470 and the long couplers 420 and 430 are similar to the positional relationship between the short coupler 270 and the long couplers 220 and 230. Further, a reception circuit (not illustrated) is connected to one end of each of the short couplers 270, 370, and 470.

In the present exemplary embodiment, the short couplers 270, 370, and 470 are disposed at positions different from each other in an lengthwise direction (from 0° to 360° direction in FIG. 4) of the long couplers 220, 230, 320, 330, 420, and 430. For example, in FIG. 4, the short couplers 270, 370, and 470 are disposed at positions of 100°, 220°, and 340°, respectively. In this case, a transmission signal control unit 260 attenuates or stops signals to be input to the long couplers weakly coupled with the short couplers 270, 370, and 470 in each of the pairs of the long couplers and short coupler, which are the long couplers 230, 320, and 420. In this way, it is possible to reduce interference noises from adjacent long couplers. For example, in a case where similar signals are input to each of the long couplers 220, 230, 320, 330, 420, and 430, the short coupler 370 receives interference noises mainly from the long couplers 230 and 430. However, the noises can be reduced by 6 decibels (dB) by stopping the supply of signals to the long coupler 230, compared with a case not stopping the supply of signals. Similarly, the S/N ratio of the wireless communication between the short coupler 270 and the long coupler 220 is improved. While, in the present exemplary embodiment, the case where three pairs of couplers each for wireless communication are disposed at positions adjacent to each other is described, the number of pairs are not limited to three pairs, as long as two or more pairs are included.

The positional relationship of the short couplers 270, 370, and 470 are not limited to the above-described example. For example, the short couplers 270, 370, and 470 can be disposed at positions shifted 90° and 180°. In a case where three or more short couplers are used, adjacent short couplers are desirably disposed at positions shifted from each other, but a short coupler disposed at a position not shifted from other short couplers can be present. Further, like the first exemplary embodiment, the substrates can have a ring shape. More specifically, the second exemplary embodiment is applicable to a system in which the position of 0° and the position of 360° in FIG. 4 correspond with each other.

As described above, in the communication system 200 according to the present exemplary embodiment, the short couplers 270, 370, and 470 for wireless communication with the long couplers 220 and 230, 320 and 330, and 420 and 430, respectively, are disposed at positions shifted from each other in the signal transmission directions of the long couplers 220, 230, 320, 330, 420, and 430. In this way, it is possible to reduce interference noises from the adjacent long couplers and improve the S/N ratio of the wireless communication by controlling signals to be input to the long couplers based on intensity of the coupling between the long couplers and the short coupler. Further, it is possible to suppress increase of a system size because the structure of shielding the wireless communication unit to reduce interference noises from outside or other communications is not required.

Figure 5:
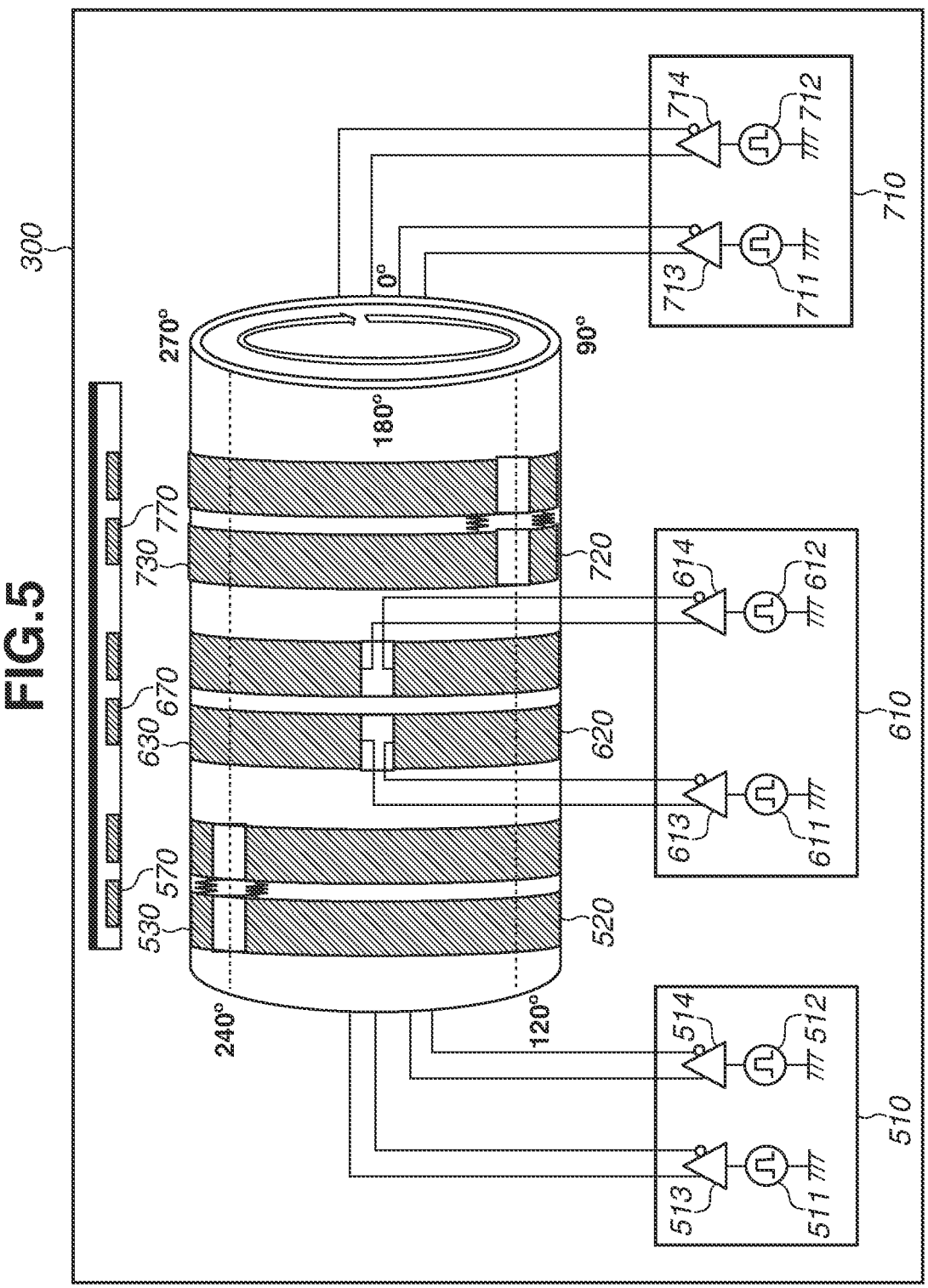
FIG. 5 is a diagram illustrating an example configuration of a communication system according to a third exemplary embodiment.

Next, a communication system 300 according to a third exemplary embodiment will be described. Hereinbelow, the points different between the third exemplary embodiment and the second exemplary embodiment will be mainly described, and the redundant descriptions are omitted. FIG. 5 is a diagram illustrating an example configuration of the communication system 300 according to the third exemplary embodiment. In the second exemplary embodiment, the short couplers 270, 370, and 470 are disposed at positions shifted from each other in the signal transmission directions of the long couplers 220, 230, 320, 330, 420, and 430. In the third exemplary embodiment, short couplers are disposed at a same position in signal transmission directions of long couplers, but input ends of the long couplers are disposed at positions different from each other in the signal transmission directions of the long couplers.

In the communication system 300, a transmission circuit 510 includes signal sources 511 and 512 and differential buffers 513 and 514 and inputs signals to input ends of long couplers 520 and 530. A transmission circuit 610 includes signal sources 611 and 612 and differential buffers 613 and 614 and inputs signals to input ends of long couplers 620 and 630. A transmission circuit 710 includes signal sources 711 and 712 and differential buffers 713 and 714 and inputs signals to input ends of long couplers 720 and 730. Output ends of the long couplers 520, 530, 620, 630, 720, and 730 are each terminated with a termination circuit. The long couplers 520, 620, and 720 are disposed at positions adjacent to the long couplers 530, 630, and 730, respectively. The long couplers 520 and 530 and a short coupler 570, when viewed in a direction orthogonal to the signal transmission directions of the long couplers 520 and 530, have a positional relationship overlapping each other at least in a part. A positional relationship between short coupler 670 and the long couplers 620 and 630 and a positional relationship between a short coupler 770 and the long couplers 720 and 730 are similar to the positional relationship between the short coupler 570 and the long couplers 520 and 530. Further, a reception circuit (not illustrated) is connected to one end of each of the short couplers 570, 670, and 770.

The transmission circuits 510, 610, and 710 are connected to the long couplers 520 and 530, 620 and 630, and 720 and 730, respectively, at positions different from each other in a lengthwise direction of the long couplers 520, 530, 620, 630, 720, and 730 (from 0° to 360° direction in FIG. 5). For example, in FIG. 5, the transmission circuits 510, 610, and 710 are connected to the long couplers 520 and 530, 620 and 630, and 720 and 730 at positions of 60°, 180°, and 300°, respectively. In this case, a transmission signal control unit (not illustrated) attenuates or stops signals to be input to the long couplers weakly coupled with the short couplers 570, 670, and 770, which are the long couplers 520, 620, and 720. In this way, similar to the second exemplary embodiment, it is possible to reduce interference noises from the adjacent long couplers, and the communication quality is improved. While, in the present exemplary embodiment, the short couplers 570, 670, and 770 are disposed at the same position in the signal transmission directions of the long couplers 520, 530, 620, 630, 720, and 730, the short couplers 570, 670, and 770 can be disposed at positions different from each other in the signal transmission directions of the long couplers 520, 530, 620, 630, 720, and 730. Further, the termination circuits connected to the long couplers 520, 530, 620, 630, 720, and 730 can be disposed at positions different from each other in the signal transmission directions of the long couplers 520, 530, 620, 630, 720, and 730.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-003905, filed Jan. 13, 2022, which is hereby incorporated by reference herein in its entirety.

What is claimed is:

1. A communication system configured to perform wireless communication using electromagnetic field coupling, the communication system comprising:
   a transmission circuit;
   at least two long couplers;
   a reception circuit;
   a short coupler; and
   a signal control unit;
   wherein the transmission circuit outputs a signal to one end of each of the at least two long couplers,
   wherein the reception circuit receives the signal output from the short coupler,
   wherein the signal is input from at least one of the at least two long couplers to the short coupler by electromagnetic field coupling, and
   wherein the signal control unit controls the signal output from the transmission circuit in such a manner that the signal to be input to the long coupler which is weakly coupled with the short coupler in comparison with the other long coupler is attenuated or stopped or the signal to be input to the long coupler which is strongly coupled with the short coupler in comparison with the other long coupler is amplified.

2. The communication system according to claim 1, further comprising a movement control unit configured to move the short coupler or the at least two long couplers in such a manner that a relative position of the short coupler with respect to the at least two long couplers is moved along from one end to another end of each of the at least two long couplers.

3. The communication system according to claim 1,
wherein the signal is input to one end of each of the at least two long couplers from the transmission circuit, and
wherein another end of each of the at least two long couplers is connected to a termination circuit.

4. The communication system according to claim 1, wherein the short coupler faces at least one of the at least two long couplers.

5. The communication system according to claim 1, wherein the transmission circuit includes a distributor, a signal source, an attenuator, an amplifier, and a switch.

6. The communication system according to claim 1, further comprising:
a plurality of short couplers including the short coupler;
wherein the at least two long couplers are disposed at positions adjacent to each other, and
wherein the plurality of short couplers are disposed at positions different from each other in signal transmission directions of the at least two long couplers.

7. The communication system according to claim 1,
wherein the at least two long couplers are disposed at positions adjacent to each other, and
wherein connection positions of the transmission circuit with the at least two long couplers are different from each other in signal transmission directions of the at least two long couplers.

8. The communication system according to claim 1,
wherein the at least two long couplers are disposed at positions adjacent to each other, and
wherein termination circuits each connected to a different long coupler among the at least two long couplers are disposed at positions different from each other in signal transmission directions of the at least two long couplers.

* * * * *